United States Patent [19]

Takahashi et al.

[11] Patent Number: 4,648,424
[45] Date of Patent: Mar. 10, 1987

[54] LIQUID FLOW RATE CONTROLLER

[75] Inventors: Yutaka Takahashi; Yasutada Takahashi, both of Kanagawa, Japan

[73] Assignee: Kirin Beer Kabushiki Kaisha, Tokyo, Japan

[21] Appl. No.: 575,814

[22] Filed: Feb. 1, 1984

[30] Foreign Application Priority Data

Feb. 9, 1983 [JP] Japan ............................ 58-17636[U]

[51] Int. Cl.[4] .............................................. G05D 7/01
[52] U.S. Cl. .................................................. 137/504
[58] Field of Search ............... 137/498, 504, 517, 538; 251/333, 324, 325

[56] References Cited

U.S. PATENT DOCUMENTS

| | | | |
|---|---|---|---|
| 2,198,487 | 4/1940 | Sisk | 137/504 |
| 2,584,418 | 2/1952 | Branson | 137/504 |
| 2,960,109 | 11/1960 | Wilson | 137/517 |
| 3,120,243 | 2/1964 | Allen et al. | 137/517 |
| 3,219,325 | 11/1965 | Brown | 137/625.4 X |
| 3,292,656 | 12/1966 | Armstrong | 137/504 |
| 3,422,842 | 1/1969 | Erickson | 137/504 |
| 3,464,439 | 9/1969 | Budzich | 137/504 |

Primary Examiner—Martin P. Schwadron
Assistant Examiner—Stephen M. Hepperle
Attorney, Agent, or Firm—Ladas & Parry

[57] ABSTRACT

A liquid flow controller suitable for a liquid containing numerous solid particles has a casing in which a valve body is slidably accommodated. Between the inner surface of the casing and the outer surface of the valve body is provided a wide space by forming some sliding projections. Furthermore, at least one flexible closing member is provided between the casing and the valve body. This construction enables the valve body to move smoothly without jamming of the solid particles in the liquid in the space.

1 Claim, 11 Drawing Figures

LIQUID FLOW RATE CONTROLLER

BACKGROUND OF THE INVENTION

This invention relates to a liquid flow rate controller for controlling the flow rate of a liquid such as syrup or fruit or vegetable juice in which a great number of small solid particles are mixed.

In general, fresh syrup or fruit or vegetable juice often has numerous small particles of fruit or vegetable therein. In many instances, such a liquid is stored in a pressure tank which is under pressure provided by a compressed gas. A discharge pipe is connected to the tank in order to feed the liquid to a cup for a customer through a valve or cock provided at the downstream end of the pipe. A flow rate controller or regulator is provided midway in the pipe line so that the liquid can flow at a constant pressure through the pipe.

A conventional flow controller for such use has a cylindrical casing in which a piston-like valve body is slidably accommodated. The valve body is in the shape of a cup and has an orifice at its end face facing the inlet of the casing. In addition, the valve body is urged by a coil spring toward the inlet of the casing. That is, the liquid passing through the inlet pushes the end face of the valve body toward the downstream side while compressing the coil spring.

In the side wall of the casing is provided at least one outlet which is opened and closed by the downstream end of the side wall of the valve body.

When the pressure of inflow liquid is higher than normal, the valve body is so moved as to close the outlet because the pressure of liquid which has entered the valve body through the orifice of the end face thereof is lower than that of liquid in the vicinity of the inlet.

When the outlet is closed, the liquid pressure in the valve body becomes high thereby to cause the valve body to return toward the upstream side by the returning force of the coil spring. That is, the valve body is moved in the casing according to the difference in pressure between the inflow and outflow liquids to keep the flow rate of the outflow liquid constant.

However, if such a conventional liquid flow controller is used for feeding such liquid containing small solid particles as fresh juice, the small particles are apt to stick in the space between the outer surface of the valve body and the inner surface of the casing thereby to prevent the valve body from sliding smoothly in the casing. Accordingly, in this case, the flow rate of the outflow liquid discharged from the outlet of the casing cannot be kept constant.

SUMMARY OF THE INVENTION

It is an object of this invention to provide a liquid flow rate controller in which a valve body can move smoothly in a casing even when the controller is used for controlling the flow rate of a liquid containing a great many small particles such as fresh juice, whereby the flow rate of such liquid can be adjusted accurately and reliably.

According to one aspect of this invention there is provided a liquid flow controller for controlling the outflow rate of a liquid containing a large number of solid particles such as fresh fruit or vegetable juice or the like in which a valve body is slidably accommodated in a casing having at least one liquid inflow opening and at least one liquid outflow opening, one end of the valve body being closed by an end plate having an orifice while the other end thereof is open, said valve body being urged upstream by an elastic member, between the casing and the side wall of the valve body being formed a port means for adjusting the outflow rate of the liquid flowing therethrough in a manner that said valve body is moved in the casing in response to change of the liquid pressure therein thereby to open and close the port means, characterized in that a wide space is provided between the outer peripheral surface of the valve body and the inner surface of the casing by the forming of a plurality of sliding projections, between the casing and the valve body, a flexible closing member being provided or preventing the inflow liquid from passing through the space to directly reach the outflow opening without passing through the interior of the valve body.

According to another aspect of this invention, there is provided liquid flow controller for controlling the outflow rate of a liquid containing numerous solid particles such as fresh fruit or vegetable juice or the like in which a valve body is slidably accommodated in a casing having at least one liquid inflow opening and at least one liquid outflow opening, one end of the valve body being closed by an end plate having an orifice while the other end thereof is open, said valve body being urged upstream by an elastic member, between the casing and the side wall of the valve body being formed a port means for adjusting the outflow rate of the liquid flowing through the outflow opening in a manner such that said valve body is moved in the casing in response to change of the liquid pressure therein to open and close the port means, characterized in that said casing has an expanded portion of an annular shape in which said liquid inflow opening is provided, a plurality of sliding projections being formed either on the peripheral surface of the valve body or the inner surface of the casing for forming a wide space between the valve body and the casing, at least one port being provided on the side wall of the valve body, said port means comprising a combination of at least one port and an end wall of the expanded portion or a combination of at least one port and at least one of sliding projections, between the opposite ends of the valve body and the casing being provided two flexible closing member, respectively, for closing the opposite ends of the space.

The nature, utility and further features of this invention will be more clearly apparent from the following detailed description with respect to preferred embodiments of the invention when read in conjunction with the accompanying drawings.

DETAILED DESCRIPTION OF THE INVENTION

Figure 1:
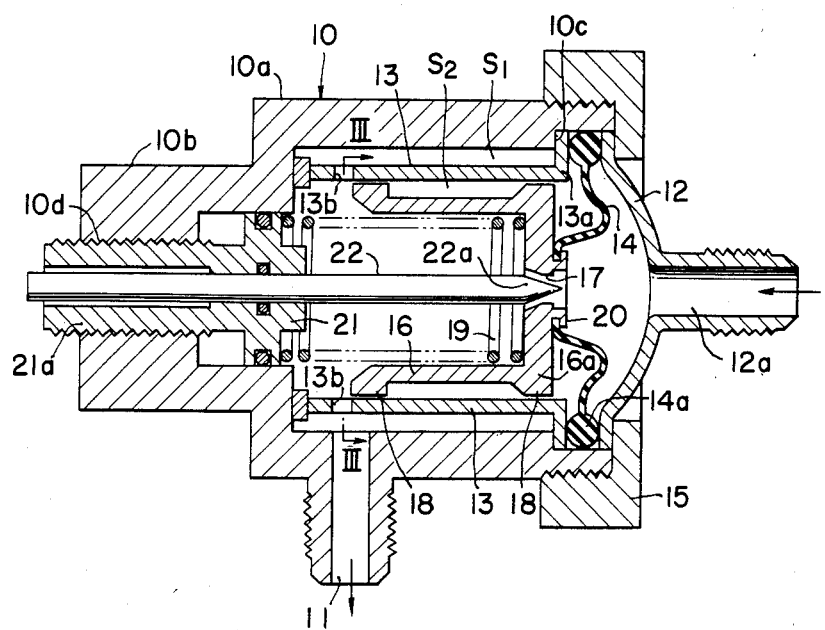
FIG. 1 is a side elevation in vertical section of a liquid flow rate controller according to this invention.

FIG. 1 shows a side elevation in vertical section of a first example of a liquid flow rate controller or regulator.

The controller has a cylindrical outer casing 10 which comprises a main body 10a and a coaxial root portion 10b having a smaller diameter than that of the main body 10a. The side wall of the main body 10a is provided with an outlet 11 for discharging liquid, and the inlet end or right end of the main body 10a as viewed in FIG. 1 is closed by a cap 12, forming a part of the outer casing 10, which has an inlet 12a for leading the liquid into the controller. The outlet 11 and the inlet 12a are respectively connected to two tubes (not shown) for feeding the liquid to be adjusted or controlled.

In the main body 10a is coaxially accommodated a cylindrical inner casing 13 in such a manner that a cylindrical space $S_1$ is formed between the inner surface of the main body and the outer surface of the inner casing 13. The left end of the inner casing 13 is fixed to the inner vertical wall of the main body 10a, and the right end of the inner casing 13 has a flange 13a which is engaged with a shoulder 10c which is formed in the right end of the main body 10a.

Between the flange 13a and the outer periphery of the cap 12 is fixed a seal ring 14a which is formed along the outer periphery of an elastic diaphragm 14 made of rubber or the like. This diaphragm 14, the outer periphery of the cap 12 and the flange 13a of the inner casing 13 are fixed to the right end of the main body by a fastening nut 15 in screw engagement with the outer periphery of the inlet or upstream end of the main body 10a.

Figure 2:
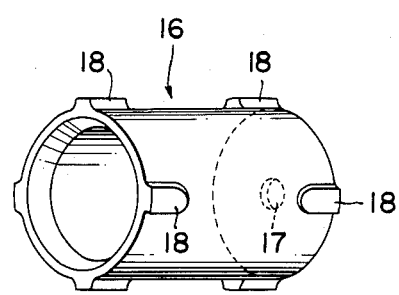
FIG. 2 is a perspective view of a valve body.
Figure 3:
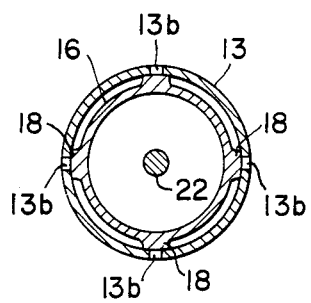
FIG. 3 is a front elevation in cross section taken along the line III—III in FIG. 1.

In the inner casing 13 is loosely accommodated a cylindrical valve body 16 which is in the shape of a cup. The valve body 16 at its right end has an end plate 16a which is provided with an orifice 17 in the center thereof. The details of the valve body 16 are shown in FIGS. 2 and 3. On the outer peripheries of the opposite ends of the valve body 16 are formed a plurality of sliding projections 18, at equal space intervals in its circumferential direction, respectively, which contact slidably the inner surface of the inner casing 13 with an ample space $S_2$ formed between the outer peripheral surface of the side wall of the valve body 16 and the inner cylindrical surface of the inner casing 13.

The valve body 16 is urged by a coil spring 19 toward the inlet 12a or the upstream side, and on the right or front face of the end plate 16a thereof is formed a fastening portion 20 for fastening an inner rim of a central hole of the diaphragm 14. The valve body 16 is held by the diaphragm 14 in a manner permitting the valve body 16 to move in the left-right directions as viewed in FIG. 1 but not permitting rotation thereof about its axis.

The inner casing 13 has a plurality of outlet ports 13b formed near the left end of its cylindrical wall in their respective angular positions corresponding to the sliding projections 18 of the valve body 16 as shown in FIG. 3, so that the ports 13b can be opened and closed by the sliding projections 18 according to the lateral movement of the valve body 16.

In the root portion 10b of the outer casing 10 is supported a holding member 21 for holding an adjusting needle 22 whose free and tapered end 22a is adjustably inserted in the orifice 17 for adjusting the opening size of the orifice 17. The holding member 21 has a male-screw portion 21a which is engaged with the female-screw portion 10d of the root portion 10b so that the needle 22 can move in the longitudinal direction.

The operation of this liquid flow controller is as follows.

The liquid containing numerous solid particles flows into the controller through the inlet 12a of the cap 12 and then enters the valve body 16 through the orifice 17. Thereafter, the liquid in the valve body 16 flows into the spaces through the ports 13b formed in the cylindrical wall of the inner casing 13, and is then discharged through the outlet 11 of the outer casing 10.

When the liquid pressure on the upstream side of the valve body 16 is relatively low, the valve body 16 is placed in a position where the ports 13b are fully opened as shown in FIG. 1. However, when the liquid pressure on the upstream side of the body 16 becomes high thereby to increase the pressure difference between the upstream and downstream sides of the valve body 16, the valve body 16 is moved in the leftward direction as viewed in FIG. 1 whereby the ports 13b are gradually closed respectively by the sliding projections 18. This results in an increase of the liquid pressure on the side of the ports 13b to cause the valve body 16 to move in the rightward direction under the returning force of the coil spring 19. Thus, the ports 13b are gradually opened, so that the amount of the outflow liquid gradually increases.

When the ports 13b are fully opened as shown in FIG. 1, the liquid pressure on the side of the ports 13b is lower than that on the side of the inlet 12a because the inflow liquid passes restrictively through the orifice 17 of the end plate 16a. Accordingly, if the coil spring 19 were not used, the valve body 16 would move in the leftward direction even when the liquid pressure on the side of the inlet 12a is very low. In this example, the total of the force due to the liquid pressure on the side of the ports 13b in the inner casing 13 and the returning force of the coil spring 19 is a combined force component tending to move the valve body 16 in the upstream direction, while the liquid pressure on the inlet 12a results in a force component urging the valve body 16 to move in the downstream direction.

Figure 4:
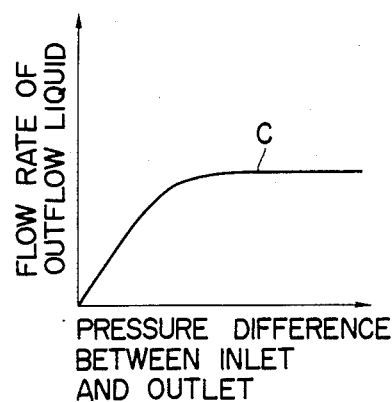
FIG. 4 is a graph showing a relationship between the flow rate of an outflow liquid and the pressure difference between the inlet of the controller and the outlet thereof.

That is, when the leftward force due to the liquid pressure on the side of the inlet 12a becomes greater than the rightward total force, the valve body 16 moves in the leftward or downstream direction. Conversely, when the force due to the liquid pressure on the inlet side becomes less than the rightward total force, the valve body 16 moves in the rightward or upstream direction. As a result, the valve body 16 assumes a standstill state of equilibrium in a position where the rightward total force is equal to the leftward force due to the liquid pressure on the inlet side. In this manner, the flow rate of the liquid discharged out of the outlet 11 is kept constant as indicated in FIG. 4. In this graph the ordinate indicates the flow rate of the outflow liquid, while the abscissa indicates the pressure difference between the inlet 12a and the outlet 11. The flow rate of the outflow liquid can be kept constant as indicated by the curved line C after the pressure difference exceeds a specific value because of the existence of the coil spring 19.

The adjusting needle 22 is not absolutely necessary in the controller in all cases. However, if the orifice 17 is narrowed or widened by moving the needle 22 in its axial direction, the flow rate of the outflow liquid can be adjusted in a very wide range.

The diaphragm 14 functions to prevent the inflow liquid from flowing from the upstream side of the valve body 16 into the space $S_2$. Even if some of the outflow liquid were to flow from the downstream side of the valve body 16 into the space $S_2$, the valve body 16 can move smoothly in its axial direction at all times because the space $S_2$ is wide enough to prevent the solid particles in the liquid from jamming in or clogging the space $S_2$.

Figure 5:
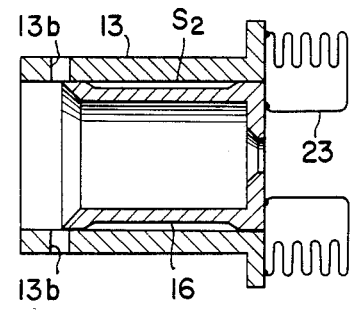
FIG. 5 is a side elevation in vertical section of a second example of this invention.

FIG. 5 shows a second example of this invention. In this example, bellows 23 are used instead of the diaphragm 14 in order to close the upstream end of the space $S_2$. However, any member for closing the upstream end of the space $S_2$ can be used if it is flexible enough to permit the valve body 16 to move smoothly in the inner casing 13.

Figure 6:
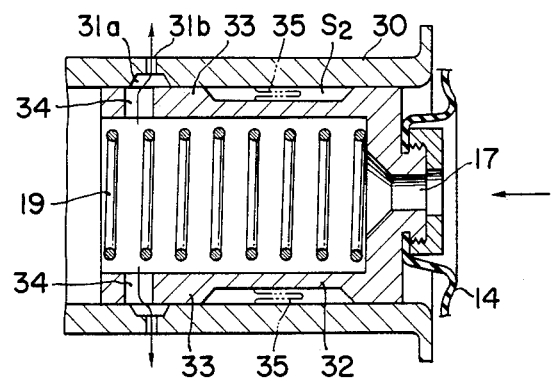
FIG. 6 is a side elevation in vertical section of a third example of this invention.

In a third example of this invention as shown in FIG. 6, a cylindrical inner casing 30 has an annular groove 31a on its inner surface and a plurality of connecting holes 31b for connecting the groove 31a to the outside of the inner casing 30. A valve body 32 slidably accommodated within the inner casing 30 has a plurality of sliding projections 33 similar to the sliding projections 18 as described in the first example. In each projection 33 is formed a port 34 for connecting the groove 31a to the inside of the valve body 32. Each port 34 is opened and closed according to the movement of the valve body 32. Such a construction in which the annular groove 31a is provided facilitates the assembly of the valve body 32 and the inner casing 30 because it is not necessary that each hole 34 be precisely registered with a respective hole 31b in their angular positions about the axis of the valve body 32 when the valve body 32 is inserted into the inner casing 30.

Instead of the diaphragm 14, a thin and flexible diaphragm 35 may be provided in the space $S_2$.

In the above three examples, the sliding projections 18, 33 are formed on the valve bodies 16, 32, respectively. However, it is desirable to form the sliding projections on the inner casings rather than on the valve bodies for reasons of convenience in the fabrication of the liquid flow controller.

In general, a valve body must be smoothly movable in an inner casing in order to accurately adjust the flow rate of a liquid to be controlled. For this purpose, the peripheral surfaces of the valve body and the inner casing are precisely finished by respectively different grinding machines. The inner surface of the inner casing is usually finished by a honing process and the outer surface of the valve body is usually finished by a centerless grinding process. In the case of the centerless grinding process, if the sliding projections are formed on the peripheral surface of the valve body, the process cannot be carried out.

Figure 7:
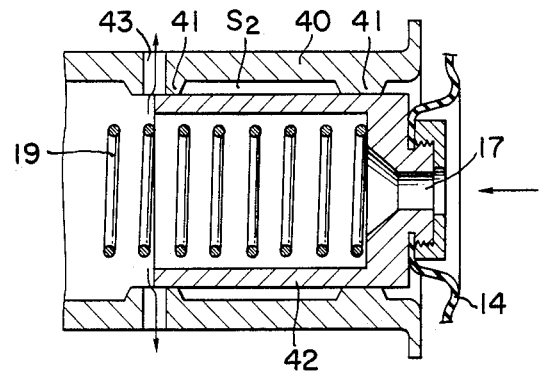
FIG. 7 is a side elevation in vertical section of a fourth example of this invention.

FIG. 7 shows a fourth example in which a plurality of sliding projections 41 are formed on the inner cylindrical surface of an inner casing 40, and the smooth outer cylindrical surface of a valve body 42 is slidably engaged with the sliding projections 41. The sliding projections 41 are annularly disposed on the inner surface of the inner casing 40 at spacedapart positions. The inner casing 40 has a plurality of ports 43 which are respectively provided in respective positions where the sliding projections 41 are formed. Each port 43 is opened and closed by the downstream end portion of the valve body 42.

In this manner, in case the sliding projections 41 are formed on the inner casing 40 so that the down stream end of the valve body opens and closes the orifices 43, not only the fabrication of the valve body but also the assembly of the valve body and the inner casing are facilitated. Because the centerless honing process can be adopted for finishing the valve body, it is not necessary to adjust the angular position of the valve body about its axis with respect to the inner casing 40 when the valve body 42 is inserted into the inner casing 40.

Figure 8:
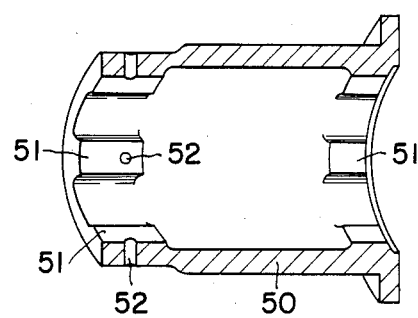
FIG. 8 is a perspective view of one half of a valve body in a state wherein it has been cut into two pieces.

In FIG. 7, the sliding projections 41 are respectively formed inside of the opposite ends of the inner casing 40. However, each sliding projection 51 may be formed in a manner such that the outer ends of the respective projections 51 extend to the opposite extreme ends of a valve body 50, respectively, as shown in FIG. 8. A port 52 is formed in each projection 51 on the downstream side of the valve body 50.

Figure 9:
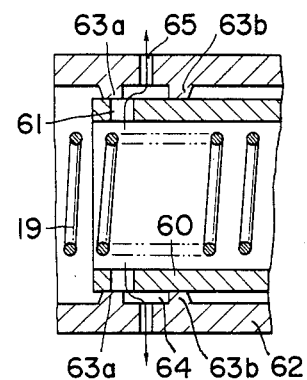
FIG. 9 is a fragmentary side elevation in vertical section of a fifth example.

In a fifth example as shown in FIG. 9, two annular sliding projections 63a, 63b are formed, with a specific spacing therebetween, on the inner surface of an inner casing 62 with an annular groove 64 formed therebetween.

In an inner casing 62 is formed a plurality of connecting holes 65 for connecting the groove 64 to the outside of the inner casing 62. Near the downstream end of a valve body 60 are formed a plurality of ports 61 for connecting the groove 64 to the interior of the valve body 60. The ports and holes 61, 65 and the groove 64 form an outlet port means. Each port 61 is opened and closed by either the projection 63a or 63b according to the movement of the valve body 60.

In this case, the cylindrical outer wall surface of the valve body 60 is smooth, without projections, and the groove 64 is provided between the ports 61 and holes 65. Accordingly, the valve body 60 can be finished by the centerless grinding method and registration between the ports and holes 61 and 65 is not necessary.

Figure 10:
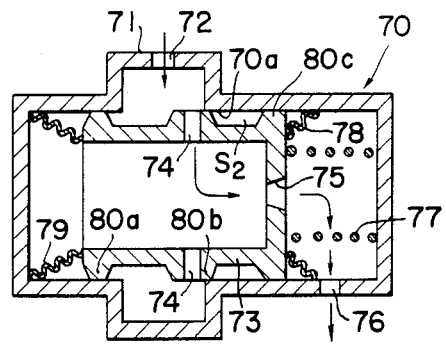
FIG. 10 is a side elevation in vertical section of a sixth example of this invention which is extremely different from the above examples.

In a sixth example of this invention as shown in FIG. 10, a cylindrical casing 70 has an annular diametrically expanded portion 71 which is provided with an inlet 72.

In the casing 70 is slidably accommodated a valve body 73 having three groups of sliding projections 80a, 80b and 80c. The projections 80b have respective ports 74. The right end face of the valve body 73 is closed except for a central orifice 75, while the opposite end thereof is open. The valve body 73 is urged by a coil spring 77 to move in the leftward direction as viewed in FIG. 10. A space $S_2$ between the outer peripheral surface of the valve body and the inner cylindrical surface of the casing 70 is closed by two respective diaphragms 78 and 79 at its opposite ends. The liquid flows as indicated by arrow marks and is discharged through an outlet 76 formed in the casing 70. The ports 74 are opened and closed by the wall portion 70a of the casing 70, whereby the outflow rate can be kept constant.

Figure 11:
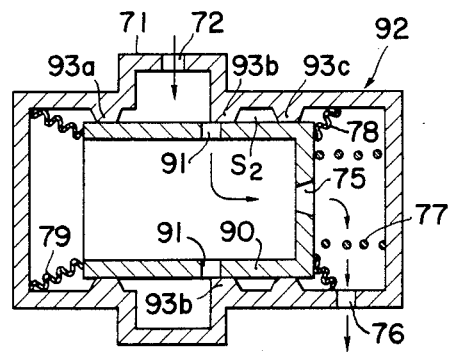
FIG. 11 is a side elevation in vertical section of a seventh example of this invention similar to that of FIG. 10.

FIG. 11 shows a seventh example of this invention similar to that of FIG. 10.

In this case, a valve body 90 has a flat side cylindrical outer wall of smooth outer surface in which a plurality of ports 91 are provided. A casing 92 for accommodating the valve body 90 has three groups of sliding projections 93a, 93b and 93c. The sliding projections 93b open and close respective ports 91 to keep the outflow rate constant.

In FIG. 11, when the inflow rate is small and the liquid pressure in the valve body 90 is low, the valve body 90 is moved in the leftward direction as viewed in FIG. 11 by a coil spring 77. However, when the inflow rate becomes large thereby to increase the liquid pressure in the valve body 90, the valve body 90 is moved in the rightward direction against the force of the coil spring 77. At this time, the ports 91 are narrowed by the sliding projections 93b thereby to reduce the inflow rate of the liquid. Thus, the outflow rate of the liquid can be continually kept constant. Furthermore, the space $S_2$ is made wide enough to prevent jamming or clogging of particles in the liquid therein even when the liquid contains a great many solid particles.

What is claimed is:

1. A liquid flow controller for controlling the outflow rate of a liquid containing a great many solid particles such as fresh fruit or vegetable juice or the like, said liquid flow controller comprising:
   (a) a casing having at least one liquid inflow opening and at least one liquid outflow opening;
   (b) a cylindrical valve body slidably accommodated in the casing, one end of the valve body being closed by an end plate having an orifice while the other end thereof is open;
   (c) elastic means for urging upstream the valve body;
   (d) a plurality of outlet ports disposed at a space interval on the downstream side of the casing in its circumferential direction for discharging the liquid from the interior of the casing;
   (e) a plurality of sliding projections formed on the outer surface of the cylindrical valve body for the provision of a wide space between the inner surface of the casing and the outer surface of the cylindrical valve body, the sliding projections being separated into two groups one of which is formed on the upstream side of the valve body and the other of which is formed at the down stream end of the valve body, each sliding projection of the other group being disposed in registration with each outlet port of the casing in their circumferential direction, the outflow rate of the liquid being adjusted in a manner that each sliding projection of the other group opens and closes each outlet port when the valve body is moved in the casing in response to change of the liquid pressure therein;
   (f) a flexible diaphragm provided between the casing and the end plate of the valve body for preventing the inflow liquid from passing through the space to directly reach the outflow opening without passing through the interior of the valve body; and
   (g) an adjusting needle having a tapered end which can be adjustably inserted into the orifice formed in the end plate in order to narrow and widen the orifice.

* * * * *